Patented June 27, 1939

2,163,745

UNITED STATES PATENT OFFICE 2,163,745

ANION MERCURI 1,3-DIHYDROXY 4-ALKYL 6-HALO BENZENE

Walter G. Christiansen, Glen Ridge, N. J., assignor to E. R. Squibb & Sons, New York, N. Y., a corporation of New York No Drawing. Original application September 13, 1934, Serial No. 743,840. Divided and this application August 30, 1938, Serial No. 227,502

6 Claims. (Cl. 260—433)

This invention relates to, and has for its object the provision of, anion mercuri 1,3-dihydroxy 4-alkyl 6-halo benzene.

This application is a division of Serial No. 743,840, filed September 13, 1934, now Patent No. 2,137,236.

The mercuri alkyl phenol derivatives of this invention have the general formula

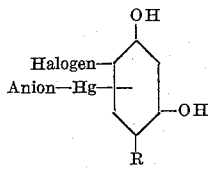

wherein R represents alkyl, especially an alkyl having at least four carbon atoms. They may be prepared by interacting the corresponding unmercurated alkyl phenol derivatives with mercuric acetate, and replacing the acetoxy with the desired anion by means of the compound of that anion with an alkali-metal (cf. Whitmore's Organic Compounds of Mercury, 1921, pp. 257, 258). These mercuri phenol derivatives have been found to be active germicides.

The following example is illustrative of the invention:

Acetoxymercuri 1,3-dihydroxy 4-butyl 6-chloro benzene

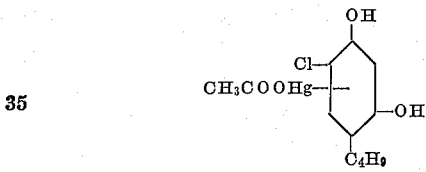

0.9 g. 1,3-dihydroxy 4-butyl 6-chloro benzene is dissolved in 10 cc. ethyl alcohol, and while the solution is refluxed, 1.5 g. mercuric acetate dissolved in 10 cc. water is added. After two hours of refluxing, a test for divalent mercury being negative, and the reaction mixture being brownish and turbid, the alcohol is evaporated off and the mass dissolved in dilute alkali. Finely divided reduced mercury is filtered out. Precipitation is effected by means of acetic acid. For purification, the precipitate is dissolved in boiling alcohol, and a slight residue filtered out. Diluting the alcoholic solution with water yields the desired compound as a pinkish precipitate.

Among the numerous other compounds that may be prepared in accordance with the invention are the following (the chloro, the cyano, the thiocyano, the nitrato, and the hydroxy compounds being formed by treating solutions of the acetoxy compound with, respectively, the chloride, the cyanide, the thiocyanide, the nitrate and the hydroxide, of an alkali metal).

Acetoxymercuri 1,3-dihydroxy 4-amyl 6-chloro benzene.

Acetoxymercuri 1,3-dihydroxy 4-hexyl 6-chloro benzene.

The invention may be variously otherwise embodied within the scope of the appended claims.

I claim:

1. Compounds of the general formula

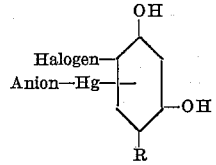

wherein R represents alkyl.

2. Compounds of the general formula

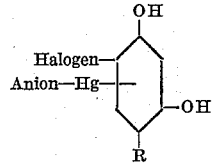

wherein R represents an alkyl having at least four carbon atoms.

3. Compounds of the general formula

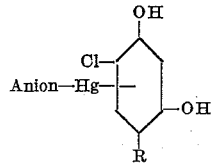

wherein R represents alkyl.

4. Acetoxymercuri 1,3 - dihydroxy 4 - butyl 6-chloro benzene.

5. Acetoxymercuri 1,3 - dihydroxy 4 - amyl 6-chloro benzene.

6. Acetoxymercuri 1,3 - dihydroxy 4 - hexyl 6-chloro benzene.

WALTER G. CHRISTIANSEN.